US012809589B2

(12) United States Patent
Bruno et al.

(10) Patent No.: US 12,809,589 B2
(45) Date of Patent: Nov. 24, 2026

(54) MICRO FRONT-END COMPOSITION AND POLYMORPHISM

(71) Applicant: Wells Fargo Bank, N.A., San Francisco, CA (US)

(72) Inventors: John Bruno, Scottsdale, AZ (US); Sean Edward Falese, Jenkintown, PA (US); Arnaud Versini, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 374 days.

(21) Appl. No.: 18/329,749

(22) Filed: Jun. 6, 2023

(65) Prior Publication Data

US 2024/0411523 A1 Dec. 12, 2024

(51) Int. Cl.

| | |
|---|---|
| ***G06F 9/44*** | (2018.01) |
| ***G06F 8/20*** | (2018.01) |
| ***G06F 9/445*** | (2018.01) |
| ***G06F 9/45*** | (2006.01) |
| ***G06F 9/455*** | (2018.01) |
| ***G06F 16/958*** | (2019.01) |

(52) U.S. Cl.

CPC .............. *G06F 8/20* (2013.01); *G06F 16/986* (2019.01)

(58) Field of Classification Search

CPC ........... G06F 8/20; G06F 16/986; G06F 9/451

See application file for complete search history.

(56) References Cited

U.S. PATENT DOCUMENTS

| | | | | |
|---|---|---|---|---|
| 11,137,887 | B1 * | 10/2021 | Garibaldi | G16H 40/20 |
| 11,150,791 | B1 | 10/2021 | Garibaldi et al. | |
| 11,216,602 | B2 | 1/2022 | Bourhani et al. | |
| 11,411,800 | B1 * | 8/2022 | Murugesan | H04L 69/40 |
| 12,061,918 | B2 * | 8/2024 | Ricklis | G06F 9/45529 |
| 12,229,536 | B1 * | 2/2025 | Gurtu | G06F 8/70 |
| 2019/0347143 | A1 | 11/2019 | Carteri et al. | |
| 2020/0285516 | A1 | 9/2020 | Darling et al. | |
| 2021/0132962 | A1 | 5/2021 | Makhija et al. | |
| 2021/0248205 | A1 * | 8/2021 | Tank | G06F 16/986 |
| 2022/0092109 | A1 * | 3/2022 | Li | G10L 15/02 |
| 2022/0300524 | A1 | 9/2022 | Banerjee et al. | |
| 2023/0009811 | A1 | 1/2023 | Bakos et al. | |
| 2023/0036980 | A1 * | 2/2023 | Chen | G06F 9/547 |

(Continued)

OTHER PUBLICATIONS

Yifei Gong, The Architecture of Micro-services and the Separation of Frond-end and Back-end Applied in a Campus Information System, 2020, pp. 1-4. https://ieeexplore.ieee.org/stamp/stamp.jsp?tp=&arnumber=9213662 (Year: 2020).*

(Continued)

*Primary Examiner* — Mongbao Nguyen

(74) *Attorney, Agent, or Firm* — Merchant & Gould P.C.

(57) ABSTRACT

A system including at least one processor and non-transitory computer-readable storage storing instructions that, when executed by the at least one processor, cause the system to: generate a context configuration module programmed to compose a user experience based on a user context and a registry of micro front-ends; and generate a rendering module programmed to render one or more micro front-ends from the registry of micro front-ends into a framework to deliver the user experience.

8 Claims, 6 Drawing Sheets

(56) References Cited

U.S. PATENT DOCUMENTS

| | | | | |
|---|---|---|---|---|
| 2023/0092123 | A1* | 3/2023 | Silverstein | G06F 16/248 707/803 |
| 2023/0229398 | A1* | 7/2023 | Sathaye | G06F 8/10 717/104 |
| 2023/0251835 | A1* | 8/2023 | Manohar | G06F 8/36 717/107 |
| 2023/0334227 | A1* | 10/2023 | East | G06F 9/4498 |
| 2023/0385027 | A1* | 11/2023 | Kolesov | G06F 8/30 |
| 2024/0272917 | A1* | 8/2024 | Mishra | G06F 8/38 |
| 2024/0273019 | A1* | 8/2024 | Mohata | G06F 8/65 |
| 2024/0303094 | A1* | 9/2024 | Premkrishna | G06F 9/451 |
| 2024/0320591 | A1* | 9/2024 | Garvey | G06F 30/27 |
| 2024/0330021 | A1* | 10/2024 | Dominguez | H04L 67/02 |
| 2024/0394021 | A1* | 11/2024 | Bhargava | G06F 8/36 |

OTHER PUBLICATIONS

Chris Lattner, MLIR: Scaling Compiler Infrastructure for Domain Specific Computation, 2021, p. 1-3. https://ieeexplore.ieee.org/stamp/stamp.jsp?tp=&arnnumber=9370308 (Year: 2021).*
Gabriel Kanev, Leveraging User Experience for Enhancing Product Design: A Study of Data Collection and Evaluation, 2023, pp. 1-6. https://ieeexplore.ieee.org/stamp/stamp.jsp?tp=&arnnumber=10156767 (Year: 2023).*
James Beswick, Server-side rendering micro-frontends—the architecture, 2022, pp. 1-6. https://aws.amazon.com/blogs/compute/server-side-rendering-micro-frontends-the-architecture/ (Year: 2022).*
U.S. Appl. No. 17/663,572, filed May 16, 2022.
U.S. Appl. No. 17/658,015, filed Apr. 5, 2022.
U.S. Appl. No. 63/268,935, filed Mar. 7, 2022.

* cited by examiner

MICRO FRONT-END COMPOSITION AND POLYMORPHISM

BACKGROUND

Users access many different types of sites to interact with businesses. These sites are programmed to provide information and desired functionality to the users. However, these sites can be difficult to create, particularly when different users have different needs and priorities. This can result in sites that may not be optimized for all users.

SUMMARY

Embodiments are directed to a system including at least one processor and non-transitory computer-readable storage storing instructions that, when executed by the at least one processor, cause the system to: generate a context configuration module programmed to compose a user experience based on a user context and a registry of micro front-ends; and generate a rendering module programmed to render one or more micro front-ends from the registry of micro front-ends into a framework to deliver the user experience.

According to aspects of the present disclosure, the framework defines at least one of a message format, a time period for an action, and an operation message requirement.

According to other aspects of the present disclosure, the user data comprises real-time data of user interaction with the user experience. For example, as a user interacts with the contextual interface, the interactions may be recorded by the system and converted to updates to the contextual information. As the contextual information is updated, the contextual interface may change automatically to provide updated presentations and functions.

According to further aspects of the present disclosure, each of the one or more micro front-ends is rendered with a first presentation. According to still further aspects of the present disclosure, at least one of the one or more micro front-ends is rendered with a second presentation in response to a change in the user data. According to yet further aspects of the present disclosure, a feedback prompt is provided to the user along with the second presentation.

According to other further aspects of the present disclosure, each of the first presentation and the second presentation provide the same functionality. According to yet other aspects of the present disclosure, each of the first presentation and the second presentation is selected from a group consisting of a tile, a button, a header element, and a hyperlink.

According to other further aspects of the present disclosure, the template comprises at least one open slot to be filled at runtime.

According to aspects of the present disclosure, at least one of the one or more micro front-ends is removed from the user experience based on a lack of or reduction in user data associated with interaction with the at least one micro front-end. According to other aspects of the present disclosure, the context configuration module is further programmed to: present the registry of micro front-ends to the user; receive a selection from the user; and compose the user experience based on the selection. According to yet other aspects of the present disclosure, the context configuration module is further programmed to: prompt the user to make a selection between at least two micro front-ends; and compose the user experience based on the selection.

Other embodiments herein are directed to a method for composition of polymorphic micro front-end experiences. The method includes retrieving a template and composing a composite micro front-end by combining one or more atomic micro front-ends according to the template. According to aspects of the present disclosure, the template defines one or more of a conformance criteria, a layout, a branding, and a sizing. According to other aspects of the present disclosure, at least one of the one or more atomic micro front-ends is pre-authored. According to still other aspects of the present disclosure, the one or more micro front-ends are selected according to interdependence. According to yet other aspects of the present disclosure, wherein the template comprises at least one open slot to be filled at runtime.

Other embodiments herein are directed to a method of rendering a polymorphic micro front-end. The method includes rendering a micro front-end with a first function and a first presentation according to a user context; determining a change is present in the user context; and rendering the micro front-end with a second function and a second presentation according to the change in the user context.

According to aspects of the present disclosure, each of the first presentation and the second presentation is selected from a group consisting of a tile, a button, a header element, a composite micro front-end, a sidebar, a chat element, and a hyperlink. According to other aspects of the present disclosure, the method further includes prompting as user to provide feedback on the second presentation. According to yet other aspects of the present disclosure, the change is based on a user interaction with the micro front-end.

The details of one or more techniques are set forth in the accompanying drawings and the description below. Other features, objects, and advantages of these techniques will be apparent from the description, drawings, and claims.

DETAILED DESCRIPTION

Figure 1:
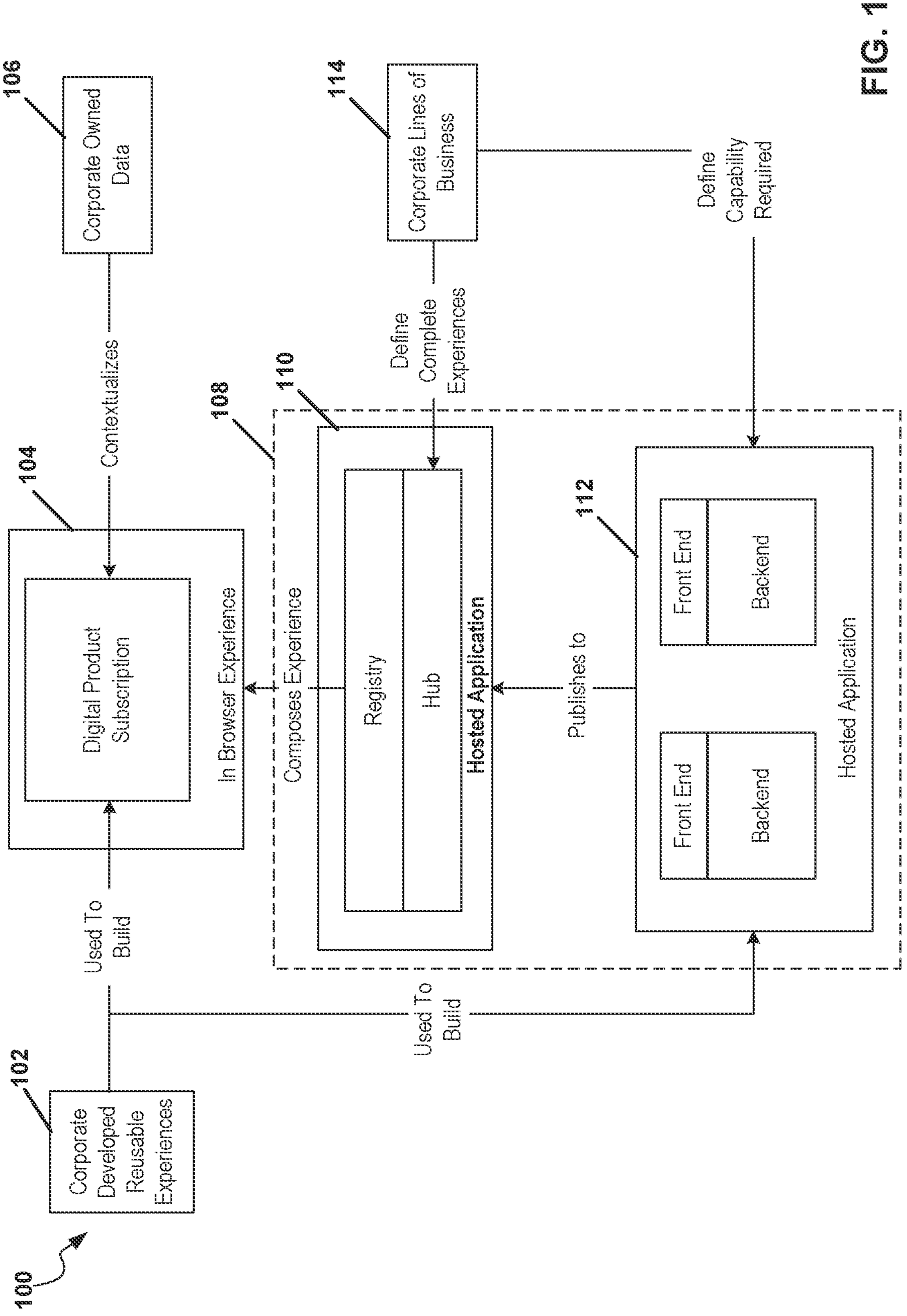
FIG. 1 shows an example system programmed to generate contextual interfaces using micro front-end components.

Embodiments are directed to composite and polymorphic micro front-ends, along with their composition and operation.

Enterprises with legacy monolithic applications can benefit from an approach that easily allows them to develop and publish related "micro front-ends". Technology teams across the enterprise can develop reusable "micro front-end" components for other teams to consume in building their modern applications. Each team would develop in an efficient agile manner while reducing dependencies and risk to delivering value to customers.

In examples provided herein, applications with contextual interfaces can be composed of conforming micro front-end components that are available on a hub. Tools may be leveraged to help generate conforming micro front-ends for efficient development and consistency in desired behavior.

Examples provided herein relate simplifying the development of web and mobile user experiences. The examples can standardize user experience layers and Application Programming Interface (API) integrations to provide personalized contextual interfaces for a user. The principles of the present disclosure may be implemented across various known and future experiences, including existing operating systems and applications with embedded micro front-ends.

In some examples, these contextual interfaces can be composed of smaller micro front-end components that behave and can be released independently while conforming to specified control structures and standards. In some examples, conforming micro front-end components can be offered on a hub for consumption. Micro front-end components can appear on a user interface in a variety of forms depending on the desired contextual interface.

In some examples, data known about users is leveraged to further enhance the personalized nature of the contextual interfaces. This can include composition of an aggregate digital interface through an easily consumable hub organized by common attributes and enabled for personalization.

In some examples, the contextual interfaces are provided in the financial services industry, although the interfaces can be equally applicable in other contexts.

Additional details regarding an example system including such micro front-ends are provided in U.S. patent application Ser. No. 17/663,572 filed on May 16, 2022, the entirety of which is hereby incorporated by reference.

In examples, discussed herein, micro front-ends may take on many forms and may be polymorphic in nature. A micro front-end may dynamically adapt the experience it provides or its behavior according to the contextual experience in which it is implemented. For example, a micro front-end supporting bill pay may be rendered as a clickable tile that shows an amount to be paid with a due date, but that same micro front-end may also be rendered as a clickable button in the header with the word "Pay". Clicking on either of these modalities reveals the same underlying experience as determined by the micro front-end in conjunction with a central coordination platform organizing the experience.

An individualized experience may be composed that calls for the inclusion of a bill pay micro front-end with a tile modality in one moment then to switch to include that same micro front-end using a button modality as the context changes, for example as a user transitions from a web to a chat session. In embodiments, the micro front-end dynamically adapts its modality, display, and behavior for a seamless end user experience.

Micro front-ends may be composite or atomic in nature. As discussed herein, composite micro front-end refers to a collection of "sub" micro front-end and which serves to aggregate related capability and simplify experience management. For example, a composite micro front-end may contain a collection of payment related micro front-end that support wires, electronic funds transfer such as Automated Clearing House (ACH), and virtual cards, which are grouped together. These example micro front-ends may each in turn be composed of one or more composite micro front-end and/or one or more independent atomic micro front-ends, all of which form an addressable micro front-end hierarchy within the individualized experience. The coordination platform is able to manage composite micro front-end as one entity thus simplifying operations. For example, in asking the composite to render itself, all of the micro front-end contained in the composite hierarchy are caused to render.

In examples discussed herein, each micro front-end associates with one or more available templates. Templates may define layout, branding, sizing, etc. and serve to ensure each micro front-end adapts and renders consistently within contained and neighboring micro front-end in the experience. Consistency is also achieved by strict conformance to the micro front-end framework which allows micro front-ends to be hosted on a central hub or hub. Conformance includes such things as the requirement to implement handlers (e.g., to render the micro front-end), generate and process events and notifications (e.g., timeout), define default displays (e.g., system failure tile), gather data (e.g., transactional), handle preference changes (e.g., layout widgets), and so on.

Individualized experiences may be defined by a collection of composite and atomic micro front-ends that have been dynamically organized based on the contextual needs of the user at that moment in time. For example, a user may need to make payments and thus be offered composite micro front-ends that show account balances, allow payments, and provide cashflow insights.

The examples provided herein provide a practical application of the described technologies. For instance, templates may be provided during the authoring of micro front-ends, making authoring new micro front-ends which conform with system requirements easier for authors. Use of frameworks ensures composite micro front-ends continue to conform with system requirements through rendering and implementation. Composite micro front-ends allow for surfaced micro front-ends to be polymorphic and rapidly respond to changes in contextual information and improve a user's personalized experience. Many other advantages are possible.

FIG. 1 schematically shows an example system 100 that is programmed to generate contextual interfaces using micro front-end components.

The system 100 generally includes a client device 104 and a server device 108. The components of the system 100 can include one or more computing devices, such as laptops, desktops, tablets, servers, server farms, etc. Each of the computing devices includes one or more storage media encoding instructions which, when executed by one or more processors, implement the functionality described herein.

Although multiple computing devices are shown in the system 100, the functionality described herein can be implemented on one or many computing devices. In such examples, each of the computing devices communicate with the others through a network. The network can be any suitable data network, such as the internet, a wide area network, a local area network, a wired network, a wireless network, a cellular network, a satellite network, a near field communication network, or any operatively connected combination of these.

In the example shown, the client device 104 can include a plurality of devices that numbers in the hundreds or thousands. The client device 104 is programmed to provide a contextual interface for a user of the client device 104.

The server device 108 can also include a plurality of devices, such as a server farm and/or cloud computing. In this example, the example server device 108 includes a hub device 110 and a component authoring device 112. Again, each of these devices can be implemented as a single device (e.g., all within the server device 108) and/or as multiple discrete devices within the system 100.

Generally, the example component authoring device 112 is programmed to create micro front-end components. The example hub device 110 is programmed to allow those micro front-end components to be registered and used to generate contextual interfaces at the client device 104.

More specifically, the example hub device 110 is programmed to house a plurality of micro front-end components that can be used to generate a contextual interface for a user. In these examples, the micro front-end components can be combined and reused to generate the interfaces. In some examples, the hub device 110 defines conformance criteria that dictates various aspects of the micro front-end components that are allowed to be registered at the hub device 110.

The component authoring device 112 is programmed to facilitate the authoring of these micro front-end components. This can include providing tools that facilitate the development of the micro front-end components. The tools can assist in assuring that the micro front-end components meet the conformance criteria necessary for the micro front-end components to be registered by the hub device 110. More details are provided below.

Figure 2:
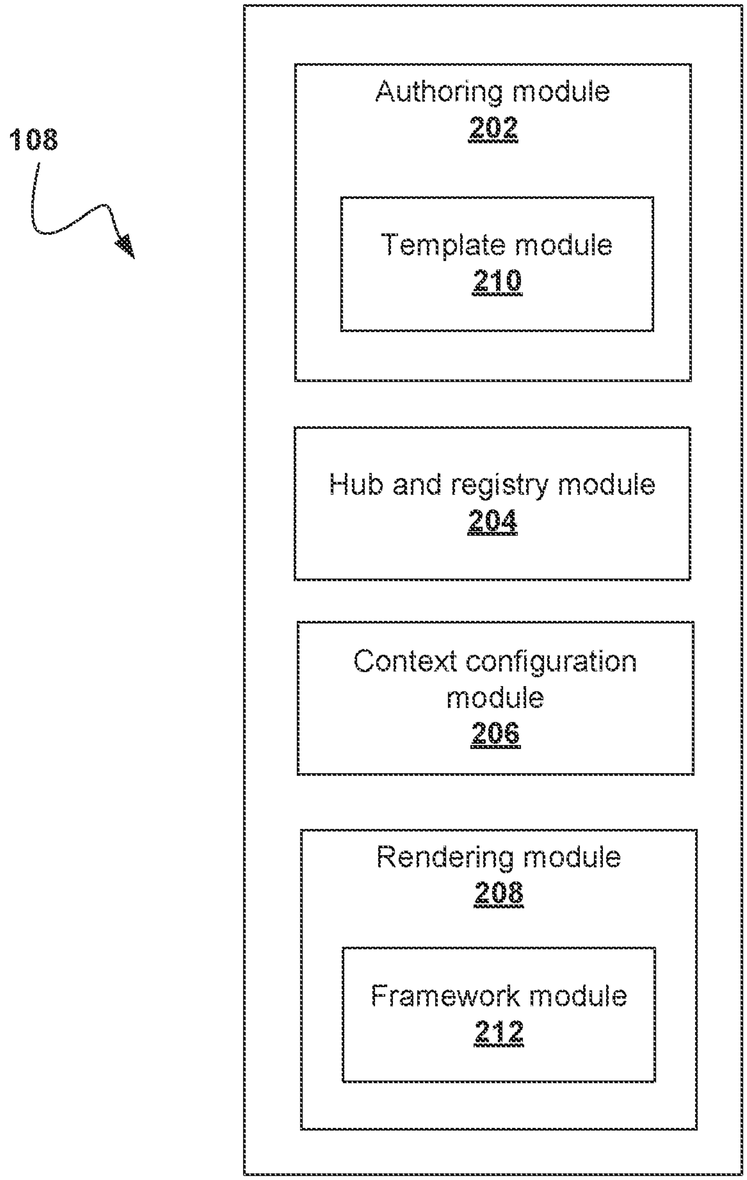
FIG. 2 shows example logical components of an example server device of the system of FIG. 1.

Referring now to FIG. 2, additional details about the server device 108 are shown. In this example, the server device 108 includes an authoring module 202, a hub and registry module 204, a context configuration module 206, and a rendering module 208. The authoring module 202 may further include a template module 210. The rendering module 208 may further include a framework module 212. Many other configurations are possible.

The example authoring module 202 is generally programmed to facilitate the creation of micro front-end components. As noted, the authoring module 202 can be accessible to developers, such as members of an organization associated with the system 100. As described further below, the organization can, in one example, be a financial institution. Developers of the financial institution can access the authoring module 202 to create micro front-end components for use in creating contextual interfaces associated with the applications provided by the financial institution to users.

In some examples, the authoring module 202 can be interactive in nature, allowing for automatic and semi-automatic (e.g., with user input) micro front-end generation. For instance, the authoring module 202 can provide wizards and pre-programmed functionality that allow for easy, semi-automatic generation of new micro front-end components.

The authoring module 202 may support authoring of atomic and composite micro front-ends. By authoring micro front-ends in atomic form, subsequent authoring of composite micro front-ends can build upon already authored atomic micro front-ends.

In some examples, the authoring module 202 is programmed to assure that the micro front-end components meet conformance criteria associated with the hub device 110. Examples of such conformance criteria are described below.

Further, the authoring module 202 can be programmed to facilitate the reuse of resources as new micro front-end components are created. For instance, the authoring module 202 can be programmed to provide libraries of code that can be combined to provide desired functionality. Further, two or more existing micro front-end components can be combined in different manners to create a new micro front-end component with desired functionality. Many other configurations are possible.

In some examples, the authoring module 202 further includes the template module 210. The template module 210 provides one or more templates for a micro front-end. A template may define a layout, a branding, a size, etc. for a micro front-end.

In one instance, the template module 210 can create an example template as follows.

| Template Name | Field 1 | Field 2 | Field 3 | Field 4 | Field 5 |
|---|---|---|---|---|---|
| Slot 1 Payment module | Payment type I | Tile modality (composite) | Orientation and size parameters | Entry control | Visible |
| Slot 2 Payment module | Payment type II | Button modality | Orientation and size parameters | Entry control | Visible |
| Slot 3 Payment module | Payment type III | Button modality | Orientation and size parameters | Entry control | Visible |
| Slot 4 Payment module | Payment type IV | Tile modality (atomic) | Orientation and size parameters | Entry control | Scrollable |
| Slot 5 Payment module | Payment type V | Tile modality (atomic) | Orientation and size parameters | Entry control | Scrollable |

An example table could describe template name; a number of available slots (e.g., five); a number of visible and or scrollable slots; orientation (e.g., vertical or horizontal); size parameters (e.g., 1×3 fixed size with adaptive height and width and responsive breakpoints); modality (e.g., tile and button modalities only); whether a slot accepts atomic or composite micro front-ends and may further indicate associated templates, such as for slots accepting composite micro front-ends which may be restricted to composite micro front-ends according to particular templates. The template coordinates a metadata description of the micro front-end which may largely become a language that is exchanged between UX designers and the runtime experience generators.

In some examples, a template may define a core of expected or required characteristics for the micro front-end. A template may be limited to defining metadata characteristics of a micro front-end or may define additional characteristics or features of the micro front-end. A particular micro front-end may be associated with one or more available templates defining layout, branding, sizing, etc. for the micro front-end to ensure it adapts to, and renders consistently within, contained or neighboring micro front-ends in the experience. For example, if the micro front-end is a composite "move money" micro front-end, an associated template could describe a number of tile "slots" organized horizontally for which sub-micro front-ends related to payments, e.g., wires, ACH, bank transfer, virtual card, Foreign Exchange (FX) payments. The slot may be filled by sub-micro front-ends inserted at runtime by a system component generating the experience.

The inserted micro front-ends in turn can individually be composite or atomic micro front-ends which have their own associated templates that drive how they are rendered by the experience platform. This may continue recursively until each atomic micro front-end with its specific modality are rendered to build the experience.

Each template describes an overall layout arrangement including, for example, a number of slots available, how each slot is arranged within the template and with respect to other slots within the template, whether a slot or template is scrollable (e.g., a template includes three visible slots and five scrollable slots, such that two additional slots can be scrolled to within the template), types of modalities that can be used within each slot (e.g., a tile, a button, etc.), branding information defining a look and feel for rendering the micro front-ends into the experience, design system criteria such as border types, colors, etc. (e.g., Vantage Graphite theme within the Wells Pioneer Design System), dimensional sizing reflecting fixed or adaptive attributes, responsive breakpoints corresponding to modality (e.g., button, tile, etc.).

In some examples, a composite micro front-end may be authored by composing a number of pre-authored atomic micro front-ends according to a template. The template may defined interconnection or interplay among the atomic micro front-ends making up the composite micro front-end, to ensure each atomic micro front-ends is adequately supported within the template and that together they from a functional composite micro front-end.

In some embodiments, the template is used to inform the experience generator in composing the ideal micro front-ends within the experience for the user according to the desired user experience (UX) design. For example, a template may rigidly define a system-facing aspect of the micro front-end, ensuring conformance with the overall coordination platform. A template may provide greater flexibility in the presentation and other user-facing aspects of the micro front-end.

A template may be configured to have one or more open “slots” when a build of the micro front-end is complete. Open slots may be filled at runtime with an atomic micro front-end according to contextual cues from the user.

In some examples, an atomic micro front-end may be built according to a template. For example, the template may define metadata characteristics, micro front-end modality requirements, or other conformance features to enable the atomic micro front-end to effectively interface with the coordination platform.

In some aspects, atomic micro front-ends can serve as individual building blocks for more complex composite micro front-ends. Atomic micro front-ends may be independent and suitable for deployment alone into an experience. Atomic micro front-ends may be specifically configured as sub-components of a composite micro front-end, and may be dependent on or interdependent with other micro front-ends.

The example hub and registry module 204 facilitates the registration of the micro front-end components with the hub device 110. In one non-limiting example, the hub and registry module 204 defines one or more API that allow new micro front-end components to be registered. Micro front-ends may be registered as independent atomic micro front-ends, or as composite micro front-ends. In this example, the registration can be in the form of a JavaScript Object Notation (JSON) contract, wherein the contract defines the conformance criteria required for each micro front-end component.

Contracts may establish, for example, that a micro front-end must implement a particular reload method, must generate a finished reloading event to other interested micro front-ends, must gather data, etc. A contract may establish a default placeholder user interface tile image, describe supported settings (e.g., a number of rows in a table a user can configure), etc. The language describing these and other contracts specific to the micro front-end ecosystem (domain) may be recorded as associated metadata on the hub.

For instance, example conformance criteria can include one or more of technical, design, and/or performance attributes. Conformance can relate to how the micro front-end component will interact with standard capabilities defined for the system 100. These can be broadly categorized into “control”, which is used to enforce the standard capabilities, and “data”, which defines the behavior of the micro front-end component.

The micro front-end components can “plug” into the “control” part. For example, to adequately personalize an experience for individual users we need to respect: a) user role entitlements (e.g., can they see the micro front-end, invoke feature, limits, etc.); b) user preferences; c) artificial intelligence-derived presentment of the micro front ends components based on a variety of factors; d) active experimentation underway; and so on.

Micro front-end components can implement methods to support these and other capabilities including to exchange and respond to state transitions, gather analytical data, adjust form factors and displays, activity targeting requests, participate in experiments, feedback, deep linking, tracing, and so on.

For instance, the technical attributes can include requirements on how the micro front-end components are created, such as using specific programming languages, and risk aspects, such as how the micro front-end components address confidential information (e.g., encryption requirements). The design attributes can include requirements on the “look and feel” of the interface generated by the micro front-end components, such as particular fonts, colors, and/or other design aspects. Some non-limiting examples of other design aspects include layouts, modalities, size parameters, visibility or alternative accessibility, orientations, whether a parameter may be adaptive or responsive to other features (e.g., presentation size or breakpoints); whether composite and/or atomic micro front-ends are accepted for a particular slot, accepted templates for micro front-ends to be received in a particular slot, etc. The performance attributes can provide certain metrics on how the micro front-end components perform, such as requiring a certain rendering and processing speeds. Many other configurations are possible.

In some examples, the server device 108 allows for the definitions of user profiles. The user profiles can define particular attributes of the user that facilitate the creation of the micro front-end components. For instance, the profile of the user can define bibliographic information about the user (e.g., location, age, etc.), the user’s role (e.g., job position and family environments), and the user’s preferences.

Once the micro front-end components are created using the authoring module 202 and registered by the hub and registry module 204, the micro front-end components are ready to be used to create the contextual interfaces. When doing so, additional contextual information can be provided to the micro front-end components as the components are assembled for display to users.

The example context configuration module 206 is programmed to provide the additional contextual information to the micro front-end components as the components are assembled to be surfaced on a contextual interface. Generally, this contextual information can include data associated with the user so that the micro front-end components are assembled in a more efficient manner. This contextual information can include, without limitation, operational information and personal information, as described further below.

The contextual information is used to drive the selection of a set of micro front-ends that are composed to yield the user experience at that moment, along with data that is available to the selected set of micro front-ends. In some examples, the hub and registry module 204 generates a most relevant experience for the user based on the contextual information. Once the experience is generated by the hub and registry module 204, the set of micro front-ends is deployed and rendered into the experience by the rendering module 208, discussed in more detail below.

For example, a unified login micro front-end may be composed that is able to leverage contextual information such as a user-id, a user device, and a user location, each of which drives an entirely differentiated experience selecting from a variety of external or internal applications for the user using the same micro front-end.

For instance, the system 100 can also include a reusable information device 102 and a user information device 106 that provide additional contextual information for the system 100 as the contextual interface is generated for the user.

In this example, the reusable information device 102 is programmed to enhance efficiency in the development and deployment of the micro front-end components. More specifically, the reusable information device 102 can monitor the functionality of existing micro front-end components and suggest the reuse of those micro front-end components when new functionality is being developed.

For instance, in the example with the financial institution, each line of business can define certain aggregated experiences associated with the functionality provided for users. The reusable information device 102 can suggest existing micro front-end components from the hub device 110 which can provide some or all the desired functionalities.

For example, assume a line of business is developing a user experience associated with payment of a mortgage. A different line of business may have already developed one or more micro front-end components used for payment of an automobile loan. One or more of these micro front-end components could be identified by the reusable information device 102 and used to develop the user experience associated with payments for the mortgage. Many other examples exist.

The reusable information device 102 can suggest atomic micro front-end components to fill out composite micro front-end open slots. In some aspects, different atomic micro front-ends with different presentations but common functionality may be changed out based on user context information and associated templates. For example, a composite micro front-end may first be presented with an atomic micro front-end configured with a button presentation. During the user's interaction with the experience, the user may open a chat feature associated with the micro front-end, resulting in a change in the context information. In response, another atomic micro front-end with the same function but a presentation as a line in the chatbox may be identified and suggested by the reusable information device 102. The composite micro front-end may be reconfigured in real-time to replace the button presentation atomic micro front-end with the chat line presentation atomic micro front-end. For example, the change in presentation may be rendered automatically in response to the user interacting with the chat feature such that the updated presentation appears virtually immediately following the user's initial interaction with the chat feature.

One non-limiting example of defining functionality and development according to user interactions in order to enhance the efficiencies of developing and providing products and services is described in U.S. patent application Ser. No. 17/658,015 filed on Apr. 5, 2022, the entirety of which is hereby incorporated by reference.

The example user information device 106 is programmed to provide additional information that may be unique to the user. For instance, with the example involving the financial institution, the user information device 106 can access additional details about the user, such as user preferences and user financial information, such as financial products and account balances. This information can be provided from the user information device 106 to the context configuration module 206 and to hub and registry module 204 when selecting the micro front-end components for the contextual interface, as described further below.

In some examples, the user information device 106 is programmed to solicit user feedback or selections. For example, a user may be presented with a visual display of micro front-ends available in a registry and a user may selected one or more micro front-ends for a contextual interface. In some cases, the user may select a particular desired function or presentation instead, and the system may automatically populate an appropriate micro front-end according to the selected function and/or presentation. In some embodiments, a micro front-end may be selected based on contextual information with some features of the micro front-end, such as the presentation, made available to the user for selection.

In addition to accessing information from the reusable information device 102 and the user information device 106, the example context configuration module 206 can also be context-aware and use machine learning to further enhance the use of the micro front-end components to generate the contextual interfaces.

For instance, the context configuration module 206 can use machine learning to understand user context. This can include prior and/or current activity associated with the system 100. For instance, a user context can be generated by the context configuration module 206 based upon what the user is currently doing. For instance, if the user is currently filling out a form on the system 100, the context configuration module 206 can access information from the user information device 106 and present micro front-end components to facilitate entry on the form, such as being pre-filled with necessary information.

Further, the context configuration module 206 can use machine learning to understand user preferences and provide that context to the rendering module 208. For instance, the context configuration module 206 can be programmed to learn about user, such as what the user wants to see, where, how, etc. For example, if the user continues to use certain functionality associated with certain micro front-end components and consistently cancels, hides, or otherwise removes other functionality, the context configuration module 206 can be programmed to use machine learning to understand those user preferences. The context configuration module 206 can provide information to the rendering module 208 to surface those micro front-end components that are more useful to the user and hide or otherwise suppress those that are not. Additional examples are provided below.

Further, the context configuration module 206 can determine preferences for the type of platforms used by the user. For instance, if the user prefers to access the system 100 via a mobile device, the context configuration module 206 can optimize the micro front-end components for mobile access. This can include changing functionality and user interface components to optimize access on a smaller screen and with different input types (e.g., touch).

In some examples, a particular micro front-end may be recalled due to a lack of or decrease in user interaction. In some examples, the presentation of one or more atomic micro front-ends making up a composite micro front-end may be adjusted according to user information patterns determined by the machine learning components. Some non-limiting examples for presentations for atomic micro-front end components include tiles, buttons, hyperlinks, chat lines, other composite micro front-ends, sidebars, and header elements.

In addition, the context configuration module 206 can be programmed to experiment to better understand preferences associated with individual users, groups of users, or an entire population of users. For instance, if a group of users, such as those over a certain age or having other common attributes, appears to struggle with functionality, the context configuration module 206 can be programmed to modify or suggest different micro front-end components with different functionality to address those shortcomings.

To accomplish this learning, the context configuration module 206 can experiment by suggesting different functionality and/or micro front-end components for different groups of users and determining which functionality and/or micro front-end components are preferred for particular users, groups of user, etc. Examples of such criteria for grouping of users includes: user role; preferences or likes; bibliographic commonality (e.g., age, gender, location, etc.), time of day, etc.

For instance, in one example, assume that a user accesses the system 100 every Friday afternoon to make a certain payment. Over time, the context configuration module 206 can use machine learning to identify such a trend. When the user accesses the system 100 on Friday afternoons, the context configuration module 206 can suggest the micro front-end components that facilitate the payment be surfaced by the rendering module 208 at a convenient location for the user so the user can efficiently make the payment. Many other configurations are possible.

One example of a system for providing a customized user experience is described in U.S. Patent Application No. 63/268,935 filed on Mar. 7, 2022, the entirety of which is hereby incorporated by reference.

The example rendering module 208 is programmed to access one or more of the micro front-end components from the hub device 110 to generate the contextual interface for the user. As noted, the rendering module 208 receives input from the context configuration module 206 when generating the contextual interface.

For instance, when a user accesses the system 100, the context configuration module 206 and/or the rendering module 208 access the relevant micro front-end components from the hub and registry module 204, and the rendering module 208 generates the contextual interface. This interface can then be displayed by a client device for the user, such as the client device 104.

In some examples, the rendering module 208 is programmed to use the information from the context configuration module 206 so that the contextual interface is specific to the user or group of users. In this manner, the contextual interface can provide greater efficiencies in information and functionality for the user.

In some examples, the micro front-end components are used by the rendering module 208 to generate various aspects of the contextual interface. Examples of such aspects in the context of the financial institution example include one or more of:

(1) header-navigation header functionality is made contextual using micro front-end components;

(2) payments-functionality associated with wire payments is made contextual using micro front-end components; and (3) consolidated view of account balances-functionality associated with the display of accounts is made contextual using micro front-end components.

Figure 4:
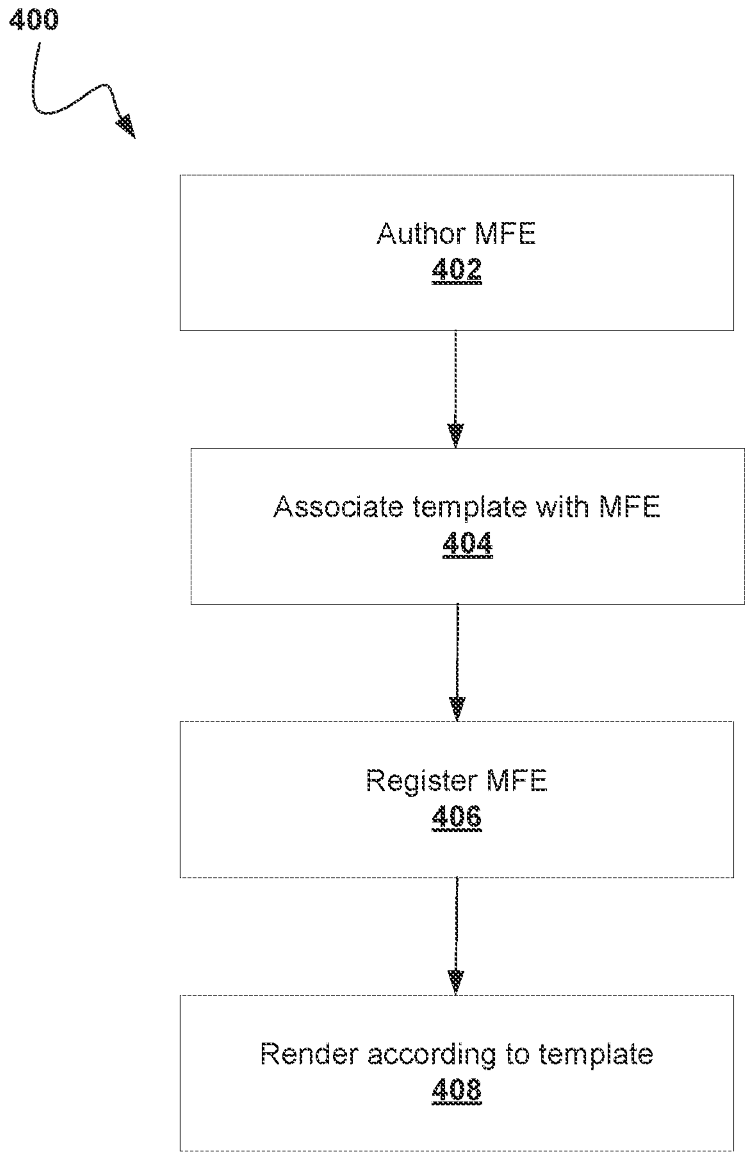
FIG. 4 shows an example method of authoring a composite micro front-end using a template.
Figure 5:
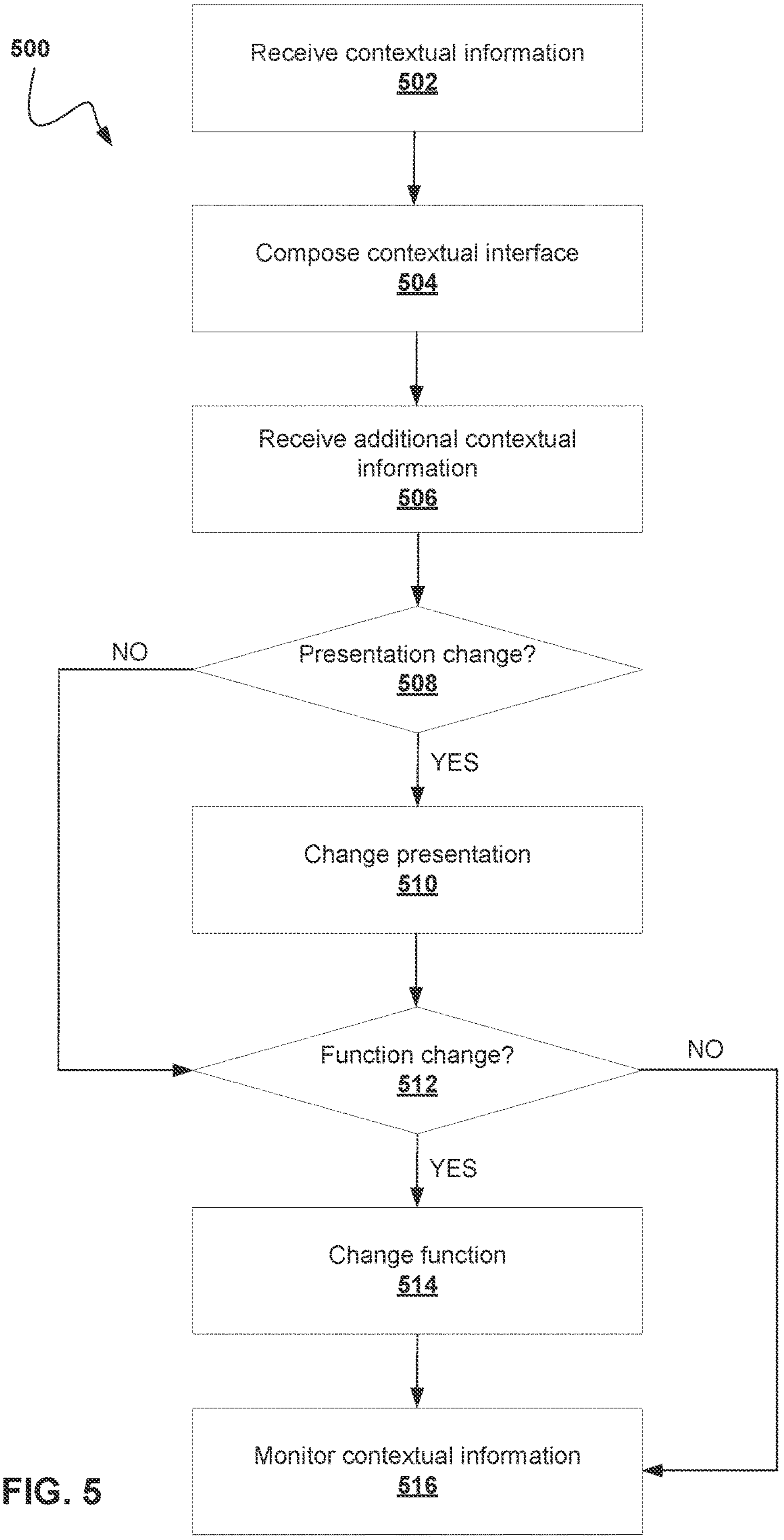
FIG. 5 shows an example method of rendering a context polymorphic micro front-end.
Figure 6:
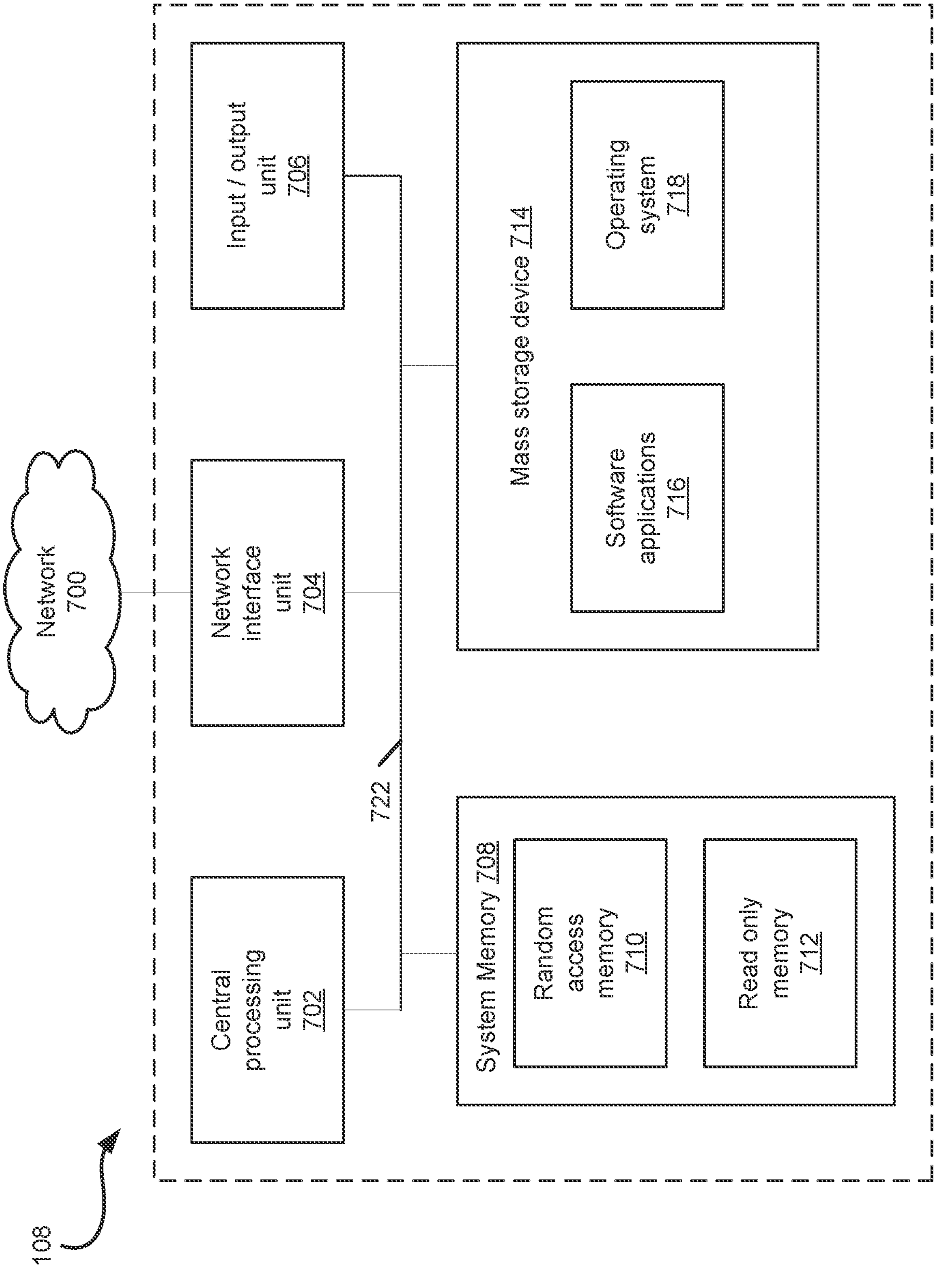
FIG. 6 shows example components of the server device of FIG. 2.

See, e.g., FIGS. 4-6. This is a non-exhaustive list of the many aspects of the contextual interface that can be generated by the rendering module 208 using the micro front-end components.

In some examples, the rendering module 208 is programmed to change how the contextual interface is generated over time. For instance, the rendering module 208 can initially generate an interface that is standard across all users, groups of users, etc. Over time, the rendering module 208 can receive additional information about the user from the context configuration module 206. Once sufficient context is developed, the rendering module 208 can be programmed to use the micro front-end components to generate the contextual interface for the user, thereby providing a customized, personalized interface. As noted herein, rendering by the rendering module 208 can be related to a variety of factors, and different users can get custom, personalized and contextual experiences based on those factors and their persona over time. Sec. e.g., FIGS. 7-9 below.

In some examples, the rendering module 208 may include sub-components, such as a framework module 212. The framework module 212 provides frameworks to ensure conformance of micro front-ends through contextual adaptions. As some nonlimiting examples, a framework may define a message format, a time period for an action, or an operation message requirement.

A runtime control plane software or application which may be hosted within a client browser orchestrates the client's experience and may maintain the framework. It may be facilitated by a domain specific language governing the micro front-ends. Each micro front-end is able "plug into" the control plane software framework because the micro front-end conforms to the domain specific language contract by being hosted on a central hub, such as the hub device 110 of FIG. 1. A build time micro front-end generator, such as component authoring device 112 of FIG. 1, and conformance testing integrated with authoring and registry functions of the system, each "builds-in" domain specific language constructs by default.

In some examples, the hub may operate using a domain specific language and associated meta data to define a set of rules. In some embodiments, the domain specific language describes the micro front-end to the ecosystem such that the micro front-end can be accepted by the hub and integrated within experiences.

For instance, the domain specific language can provide the framework that is used to define how to render the micro front-end. Metadata can also be associated with the micro front-end to define how the micro front-end is configured to interface with the framework. Conformance of the micro front-end is derived from the metadata associated with the micro front-end's runtime characteristics. The metadate can be used to ensure that only micro front-ends meeting conformance requirements can be registered and/or deployed by the hub.

In examples, a composite micro front-end includes an open slot to be filled by a candidate atomic micro front-end at run time. The slot may be initially filled with a first candidate when surfaced based on initial contextual information, and later filled with a second candidate based on a change in the contextual information. Application of the framework ensures continued conformance, and thus compatibility, through runtime changes to the micro front-end. Some non-limiting examples of conformance criteria that may be maintained by the application of a framework include messaging format, time and content expectations for messages, and response times for actions.

Frameworks may define features and functionality for micro front-ends and supports effective distillation of surfaced micro front-ends into atomic micro front-ends. As the contextual interface and composite micro front-ends evolve over time to align with a user's contextual preferences, continued application of frameworks ensure continued conformance of the micro front-ends with the overall system. In some embodiments, frameworks may be applied at build time.

Further, as noted, the rendering module 208 can be programmed to experiment over time by generating different contextual interfaces for users to determine preferences, efficiencies, etc. This can assist the context configuration module 206, hub and registry module 204, and the rendering module 208 in determining which contextual interface may be optimized for a particular user or group of users based upon machine learning.

Finally, the rendering module 208 can be programmed to make these changes automatically, such as by using machine learning. Further, the rendering module 208 can be programmed to allow the changes to be made manually by the user and/or developer. For instance, the system 100 can provide preferences that allow the user to select between a standard interface and the contextual interface, as desired. Many other configurations are possible.

Figure 3:
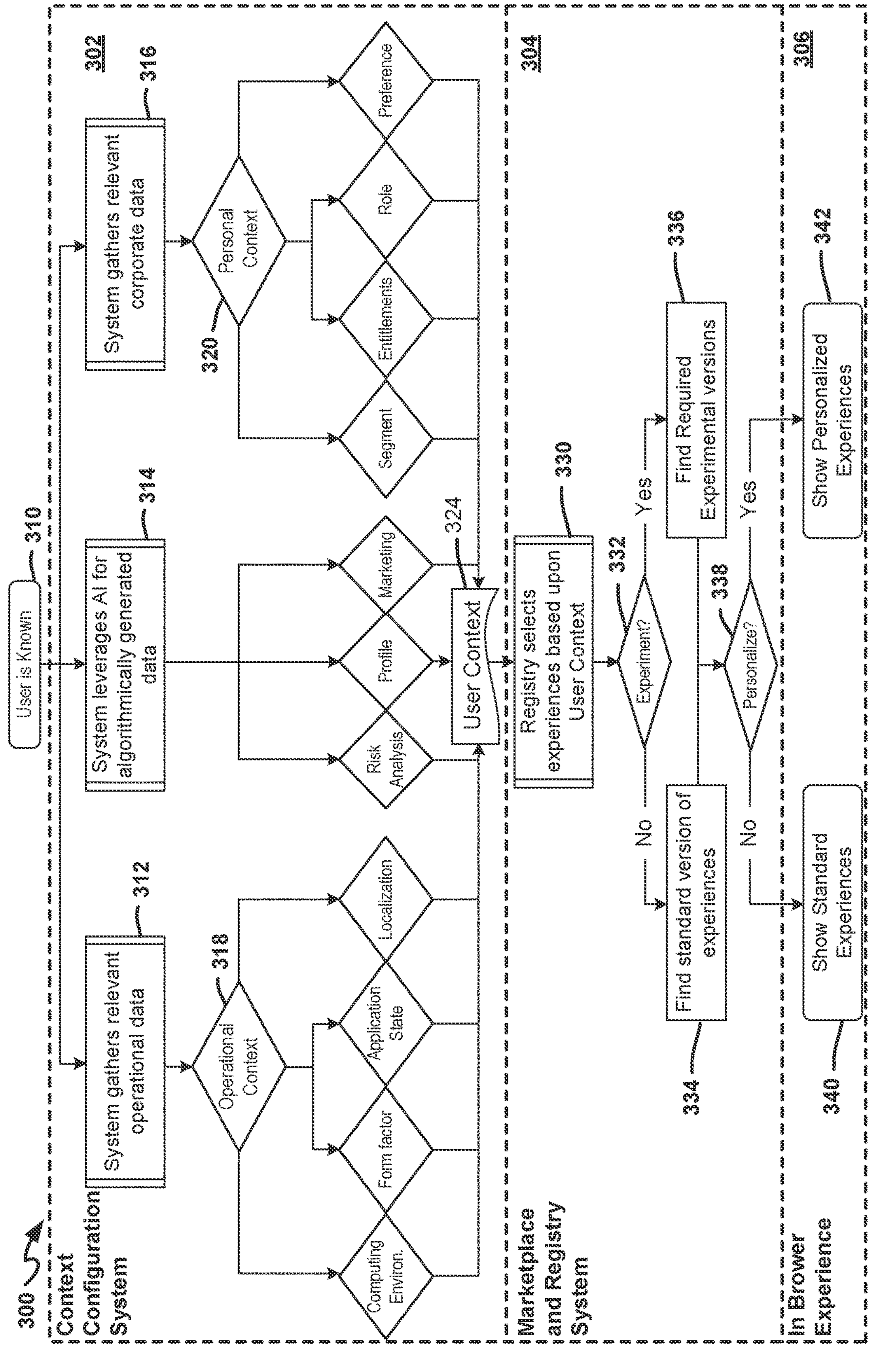
FIG. 3 shows an example method for generating the contextual interface for the user by the system of FIG. 1.

Referring now to FIG. 3, an example method 300 for generating the contextual interface for the user by the system 100 is shown. The example method 300 includes context configuration operations 302, hub and registry operations 304, and rendering operations 306.

In this example, the user is authenticated at operation 310. However, in other instances, the user need not be authenticated or otherwise known to generate the contextual interface.

Next, at operations 312 and 316, relevant data needed to generate the contextual interface is accessed. As noted, this relevant data can include information known about the user. The data can also include machine learning associated with the user or group of users, such as user preferences, etc. The data may include selections and other feedback solicited by the system or otherwise received from the user.

For example, more than one micro front-end may provide a desired functionality but without redundancy, such that each micro front-end provides a different approach or perspective to the function. User feedback may be solicited to choose between the micro front-ends, or one may be chosen based on contextual information collected according to user interaction with other similar micro front-ends, or the system may take an experimental approach.

Next, at operations 318 and 320, the information about the user is used to determine both the operational information and the personal information. As noted, these aspects are used to determine the context associated with the user so the contextual interface can be generated.

In this example, at operation 318, such information as the user's computing environment, form factor for the user' computing device, application state on the computing device, and localization based upon location can be used as operational information. Likewise, information such as the user's segment or grouping, entitlements associated with the user's stature, role, and preferences can be used as personal information.

At operation 314, the system 100 can use artificial intelligence to generate further information associated with the user. This information can relate to risks associated with the user, a profile generated for the user, and/or marketing information associated with the user, such as what products or services may be of most use to the user.

Next, at operation 324, the operational and personal information and the information generating using artificial intelligence are combined to generate the contextual information associated with the user. As described further above, this contextual information is used to select the micro front-end components that are used to create the contextual interface for the user. In some examples, the contextual information may include presentation preferences. Presentation preferences may be determined, for example, based on user feedback or interactions with various presentations to determine preferred presentations.

Next, at operation 330, the relevant micro front-end components are selected from the hub. The selected micro front-ends may be independent atomic, or composite micro front-ends.

At operation 332, a determination is made by the system as to whether experimentation is being conducted. If so, control is passed to operation 336, and experimental aspects of the micro front-end components can be selected. If not, control is instead passed to operation 334, and standard version of the micro front-end components are selected. As noted, the experimentation can be used to determine preferences for the specific user and/or preferences for a group of users or globally for all users.

Finally, at operation 338, the system 100 determines whether to provide the contextual interface to the user. If so, control is passed to operation 342, and the contextual interface is rendered. If not, control is passed to operation 340, and a standard interface is instead rendered. As noted, the decision whether to show the contextual interface can be automated, such as by the system 100 determining if enough contextual information is known for the user. Or, the decision can be manual, such as by allowing the user to decide whether to have the contextual or standard interface shown. Many configurations are possible.

Referring now to FIG. 4, an example method 400 of authoring and rendering a micro front-end using a template is shown. Method 400 may be carried out by one or more components of the system 100 of FIG. 1, such as the authoring module 202 and rendering module 208 of the server device 108.

At operation 402, a micro front-end is authored. The micro front-end may be generated entirely new or may be assembled from existing elements or some combination of new and existing elements The micro front-end may be assembled by combining one or more atomic micro front-ends to yield a composite micro front-end.

Each atomic or composite micro front-end will exist unto itself and each may associate a set of compatible templates in driving the experience. A composite micro front-end does not become composite because of the template, rather it can be rendered according to one of its associated templates.

At operation 404, the newly authored composite micro front-end may be registered. For example, the composite micro front-end may be registered with a hub, such as the hub and registry module 204 of the server device 108.

At operation 406, the micro front-end may be registered with the hub. The template may inform the basic structure of the micro front-end and ensure the micro front-end is authored such that it will comply with system conformance criteria. Conformance criteria may be applied or checked at the registry operation, such as through implementation of a domain specific language associated with the hub. In some embodiments, conformance criteria is applied and/or verified at or prior to the registration operation.

At operation 408, the micro front-end may be rendered into an experience according to an associated template. In some examples, a template may define a core of expected or required characteristics for the micro front-end. A template may be limited to defining metadata characteristics of a micro front-end or may define additional characteristics or features of the micro front-end. A particular micro front-end may be associated with one or more available templates defining layout, branding, sizing, etc. for the micro front-end to ensure it adapts to, and renders consistently within, contained or neighboring micro front-ends in the experience Referring now to FIG. 5, and example method 500 of rendering a context polymorphic micro front-end is shown. Method 500 may be carried out on or by one or more components of the system 100 of FIG. 1, such as hub device 110 of FIG. 1 or rendering module 208 of FIG. 2.

At operation 502, initial contextual information is received. In examples, the contextual information includes data associated with the user so that the micro front-end components are assembled in a personalized manner. This contextual information can include, without limitation, operational information and personal information. Contextual information may include reuse or redundancy information on one or more micro front-ends.

At operation 504, a contextual interface is composed and rendered using one or more micro front-ends. Micro front-ends may be monolithic, independent atomic, or composite micro front-ends.

At operation 506, additional contextual information is received. Additional contextual information may include real-time observations and/or feedback of user interaction with the contextual interface. In examples, "real-time" may refer to processing which occurs within a matter of milliseconds so as to appear to provide processing and feedback virtually immediately in response to input. Additional contextual information may include a change in the contextual information. For example, additional contextual information may include a pattern of decreased usage of a particular micro front-end or micro front-end feature. For another example, additional contextual information may include a change in the user's mode of interaction with the micro front-end, such as opening or interacting with a chatbox.

At operation 508, a determination is made whether the change in the contextual information calls for a change in the presentation of one or more micro front-ends in the contextual interface. In some examples, a change in presentation may be appropriate for an atomic micro front-end which forms part of a composite micro front-end.

If the determination is made, at operation 508, that a change is presentation is called for, the presentation of one or more micro front-ends within the contextual interface may be changed, at operation 510. For example, if the change involves the user interacting with a chatbox, a feature previously present as a button or tile in the header of the interface may instead or in addition be presented as a hyperlink in the chatbox. At operation 512, a determination is made whether the change in the contextual information calls for a change in the function provided by the contextual interface.

If the determination is made, at operation 508, that a change is presentation is not called for, a determination is made, at operation 512, whether a change in function is called for without a change in presentation.

If the determination is made, at operation 512, that a change in function is called for, one or more micro front-ends may be removed or surfaced into the interface to provide different and/or additional functionality, at operation 514. In some embodiments, atomic micro front-ends may be removed or inserted into an active composite micro front-end to provide the different and/or additional functionality. In some examples, modality of the atomic micro front-end may changes, such as from a tile to a chatbox depending on an associated template and the composite parent, as well as the overall experience generation algorithm.

If the determination is made, at operation 512, that a change is function is not called for, contextual information may be monitored, at operation 516. Monitoring contextual information provides for real-time identification of changes in contextual information and enables rapid updates to the contextual interface to keep pace with user interactions and preferences.

FIG. 6 schematically shows example physical components of portions of the system 100 of FIG. 1. In particular, additional components of the server device 108 are illustrated. In this example, the server device 108 provides the computing resources to perform the functionality associated with the system 100. The other computing devices associated with the system 100 can be similarly configured.

The server device 108 can be an internally controlled and managed device (or multiple devices) of the business enterprise, e.g., the financial institution. Alternatively, the server device 108 can represent one or more devices operating in a shared computing system external to the enterprise or institution, such as a cloud. Via a network 700, the components of the system 100 that are physically remote from one another can interact with one another.

The server device 108 includes a central processing unit or processor 702, a system memory 708, and a system bus 722 that couples the system memory 708 to the processor 702.

The system memory 708 includes a random access memory ("RAM") 710 and a read-only memory ("ROM") 712. A basic input/output system that contains the basic routines that help to transfer information between elements within the server device 108, such as during startup, is stored in the ROM 712.

The server device 108 further includes a mass storage device 714. The mass storage device 714 is able to store software instructions and data.

The mass storage device 714 is connected to the processor 702 through a mass storage controller (not shown) connected to the system bus 722. The mass storage device 714 and its associated computer-readable data storage media provide non-volatile, non-transitory storage for the server device 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 108.

According to various embodiments of the invention, the server device 108 may operate in a networked environment using logical connections to remote network devices through the network 700, such as a wireless network, the Internet, or another type of network. The server device 108 may connect to the network 700 through a network interface unit 704 connected to the system bus 722. It should be appreciated that the network interface unit 704 may also be utilized to connect to other types of networks and remote computing systems. The server device 108 also includes an input/output unit 706 for receiving and processing input from a number of other devices, including a touch user interface display screen, an audio input device, or another type of input device. Similarly, the input/output unit 706 may provide output to a touch user interface display screen or other type of output device.

As mentioned briefly above, the mass storage device 714 and/or the RAM 710 of the server device 108 can store software instructions and data. The software instructions include an operating system 718 suitable for controlling the operation of the server device 108. The mass storage device 714 and/or the RAM 710 also store software instructions and applications 716, that when executed by the processor 702, cause the server device 108 to provide the functionality described above.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system, comprising:

at least one processor; and non-transitory computer-readable storage storing instructions that, when executed by the at least one processor, cause the system to:

generate a context configuration module programmed to compose a user experience based on a user context and a registry of micro front-ends; and generate a rendering module programmed to render one or more micro front-ends from the registry of micro front-ends into a framework defining operational conformance requirements to deliver the user experience with a first presentation, including to:

identify a change in the user context;

render at least one of the one or more micro front-ends in response to a change in the user context with a second presentation; and provide a feedback prompt to an end user associated with the user context along with the second presentation at runtime to solicit input from the end user to evaluate the end user's experience regarding the second presentation;

use, by the framework, a domain specific language governing the one or more micro front-ends, wherein the one or more micro front-ends conform to a domain specific language contract;

record interactions of the end user with the user experience;

convert the recorded interactions into updates to the user context; and automatically change the user experience by rendering the second presentation based on the updates to the user context and the input from the end user.

2. The system of claim 1, wherein the framework defines at least one of a message format, a time period for an action, and an operation message requirement as the operational conformance requirements.

3. The system of claim 1, wherein the user context comprises real-time data of user interaction with the user experience.

4. The system of claim 1, wherein each of the first presentation and the second presentation provide a same functionality.

5. The system of claim 1, wherein each of the first presentation and the second presentation is selected from a group consisting of a tile, a button, a header element, a composite micro front-end, a sidebar, a chat element, and a hyperlink.

6. The system of claim 3, wherein at least one of the one or more micro front-ends is removed from the user experience based on a lack of or reduction in user data associated with interaction with the at least one of the one or more micro front-ends.

7. The system of claim 1, wherein the context configuration module is further programmed to:

present the registry of micro front-ends to the user associated with the user context;

receive a selection from the user; and compose the user experience based on the selection.

8. The system of claim 1, wherein the context configuration module is further programmed to:

prompt the user associated with the user context to make a selection between at least two micro front-ends; and compose the user experience based on the selection.

* * * * *